July 31, 1962 J. C. MONTGOMERY 3,047,369
APPARATUS FOR DECOMPOSING SOLID AMMONIUM SULFATE
Filed May 8, 1959 2 Sheets-Sheet 2
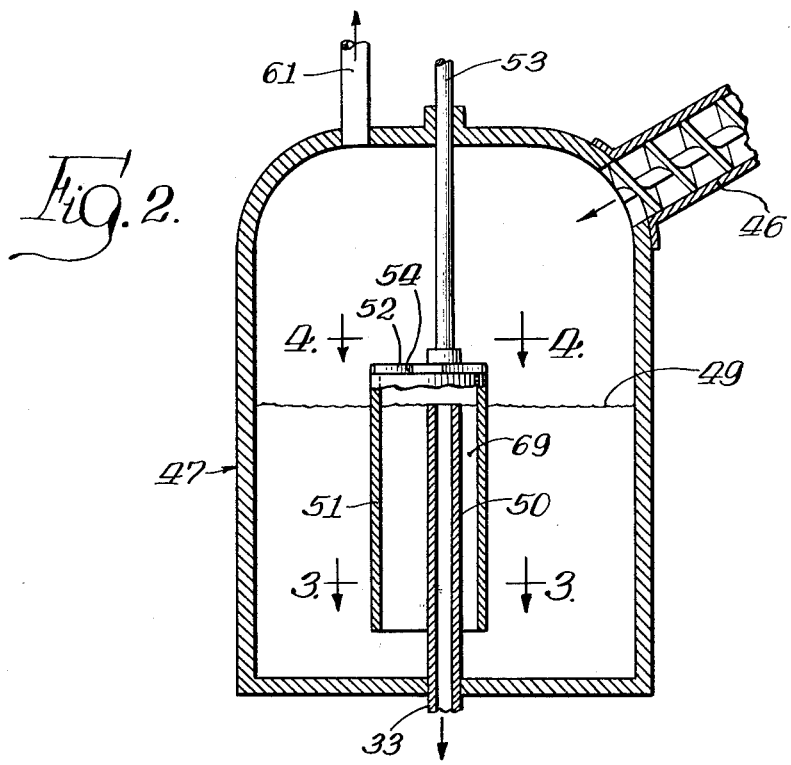
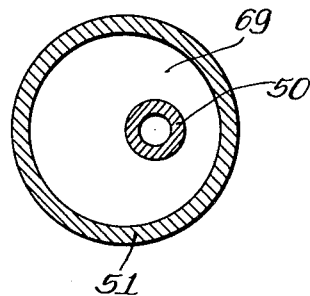
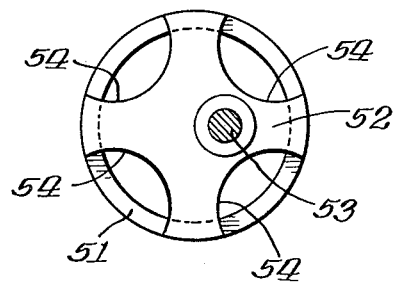
INVENTOR.
John C. Montgomery
BY
Davis, Lindsey, Hibben & Noyes
Attys.

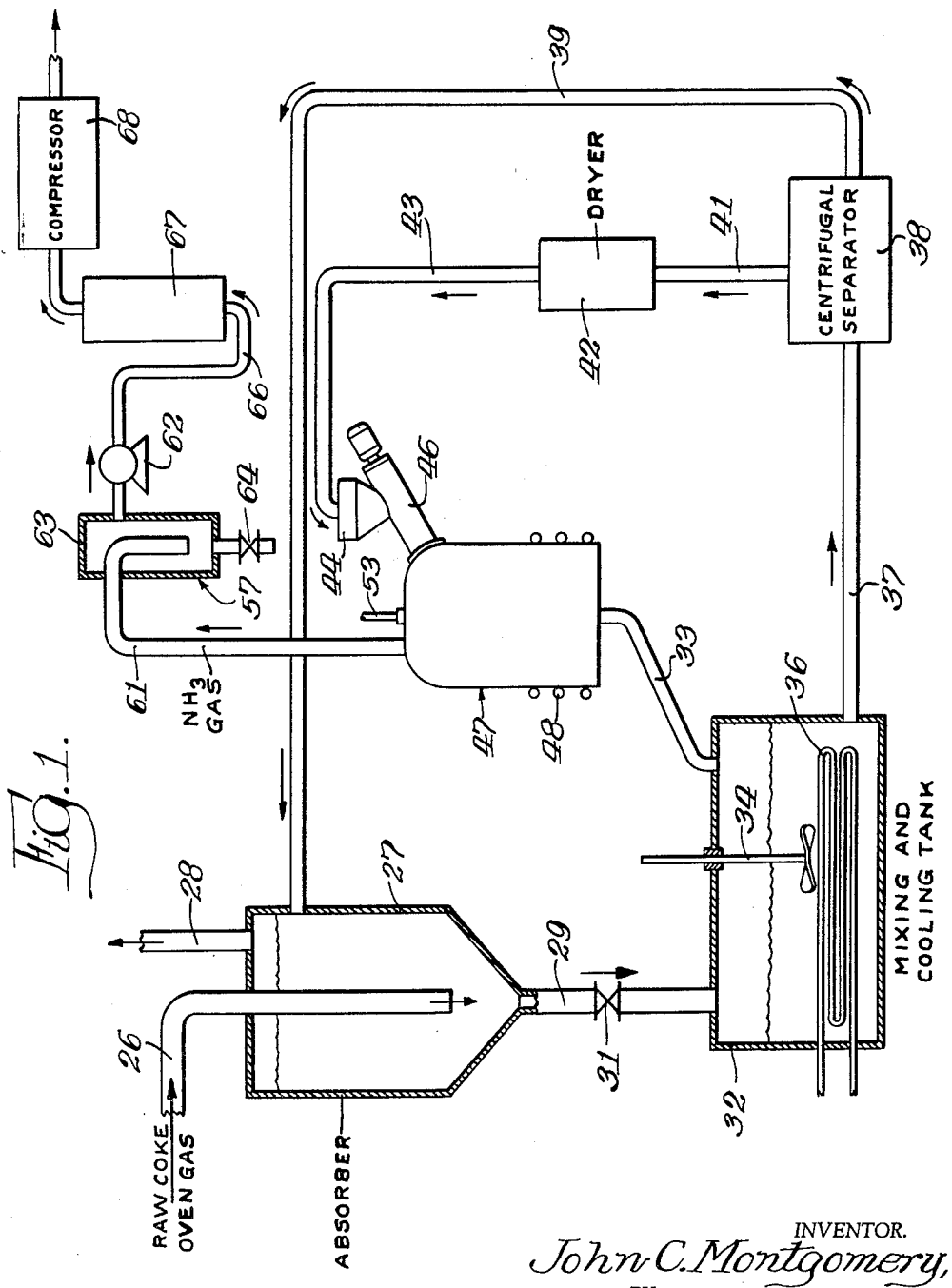

United States Patent Office 3,047,369
Patented July 31, 1962

3,047,369
APPARATUS FOR DECOMPOSING SOLID
AMMONIUM SULFATE
John C. Montgomery, Hammond, Ind., assignor to Inland Steel Company, Chicago, Ill., a corporation of Delaware
Filed May 8, 1959, Ser. No. 811,854
7 Claims. (Cl. 23—252)

This invention relates generally to a process and apparatus for converting a solid into a fluid, and more particularly, to a process and apparatus for transforming a solid material into a liquid and/or gaseous phase, as by heating a salt to decompose, dissolve, or fuse, the said salt.

In accordance with the novel general process for the recovery of ammonia from coke oven gas described in the copending application for U.S. Letters Patent Serial No. 677,317, filed August 9, 1957, now matured into Patent No. 2,898,277, an aqueous ammonium bisulfate solution is used for the absorption of ammonia from coke oven gas with the resultant production of ammonium sulfate crystals. The ammonium sulfate crystals are then separated and decomposed to yield ammonium bisulfate which can be returned to the absorption step and ammonia gas which can be purified and liquefied to yield anhydrous ammonia.

It is well known that ammonium sulfate crystals are converted by heating into fused ammonium bisulfate and ammonia gas as shown by the following equation:

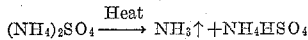

$$(NH_4)_2SO_4 \xrightarrow{\text{Heat}} NH_3\uparrow + NH_4HSO_4$$

In the thermal decomposition reaction of ammonium sulfate, however, it is essential to heat the ammonium sulfate to a controlled temperature of at least about 347° F. in order to initiate the decomposition of the ammonium sulfate crystals at atmospheric pressure, and preferably at a higher temperature up to about 675° F. where decomposition of the ammonium sulfate into ammonia and ammonium bisulfate is substantially complete without causing further objectionable decomposition of the ammonium bisulfate formed. During the heating of the ammonium sulfate, it is necessary to provide thorough agitation of the melt containing solid ammonium sulfate crystals to insure complete decomposition and removal of the ammonia gas. It is also important, particularly in connection with a continuous process, to be able to control the retention time of the salts in the decomposition vessel and to prevent the solid or fused material from prematurely passing out of the decomposition vessel through the discharge passage. Heretofore, the melt has been mixed with conventional agitators, passed over baffles, or blown with an inert gas, without, however, achieving entirely satisfactory results. Moreover, the operation has not been considered efficient from the standpoint of maintenance of equipment.

It is, therefore, an object of the present invention to provide a more efficient and economical method and apparatus for transforming a solid salt into a liquid phase by contacting with a liquid phase.

It is a further object of the present invention to provide improved method and apparatus for continuously liquefying a solid salt by contacting with a liquid phase.

It is a still further object of the present invention to provide improved method and apparatus for thermally decomposing ammonium sulfate crystals having improved means for controlling the flow of materials, whereby better heat transfer and improved separation of gases and liquids are achieved.

Other objects of the present invention will be apparent to those skilled in the art, from the following detailed description and drawing illustrating a preferred embodiment of the invention, wherein:

FIGURE 1 is a schematic view showing one arrangement of apparatus employing the improved equipment of the present invention for decomposing ammonium sulfate;

FIG. 2 is a vertical sectional view of the thermal decomposition vessel of the present invention;

FIG. 3 is a horizontal sectional view of the agitator taken along the line 3—3 of FIG. 2; and FIG. 4 is a horizontal sectional view taken along the line 4—4 of FIG. 2.

Referring to FIGURE 1 of the drawing, the raw coke oven gas is introduced through an inlet pipe 26 and is bubbled through a body of aqueous ammonium bisulfate solution contained in an absorber or saturator 27. The unabsorbed gases are removed through a line 28 to waste or further processing. A slurry comprising ammonium sulfate crystals in an aqueous solution of unreacted ammonium bisulfate substantially saturated with ammonium sulfate is removed through discharge line 29 having a valve 31 and is introduced directly into a mixing vessel 32. Molten ammonium bisulfate, obtained as hereinafter described, is also introduced into the vessel 32 through a line 33. A stirrer or other agitating device 34 is provided to insure intimate mixing of the materials charged into vessel 32. Preferably the contents of the vessel 32 are cooled by a cooling coil 36 to crystallize additional amounts of ammonium sulfate.

The slurry containing substantial amounts of precipitated ammonium sulfate crystals is withdrawn from vessel 32 through a conduit 37 and is passed through a centrifuge 38. From the centrifuge 38, a separated aqueous liquid is continuously returned through line 39 to the absorber 27. The solid ammonium sulfate crystals from the centrifuge 38 are withdrawn through line 41, passed through a drying chamber 42 and then passed through line 43 to a supply hopper 44 which holds a sufficient quantity of ammonium sulfate crystals to continuously supply the requirements of the ammonium sulfate decomposing operation.

A screw-type feeder 46 charges ammonium sulfate crystals from hopper 44 to the decomposing vessel 47 at a predetermined rate. The decomposing vessel 47 is provided with heating coils 48 which maintain the vessel at a temperature above the decomposition temperature of the ammonium sulfate crystals therein.

Referring now to FIGS. 2–4, the liquid level is maintained at the desired point in the decomposition vessel 47 by providing a vertically disposed overflow outlet tube 50 which communicates with the outlet line 33 and extends upwardly through the bottom of the vessel 47 to a suitable height within the vessel for establishing and maintaining the liquid level therein and effecting the desired retention time within the vessel 47. Although usually convenient, the overflow tube 50 need not be located centrally within the reaction vessel 47. A combined agitator and baffle or flow-control device in the form of a large diameter generally cylindrical tube 51 is mounted eccentrically above and around the overflow tube 50 within the vessel 47 with the upper end thereof extending above the upper end of the overflow tube 50 and the lower open end thereof extending downwardly with the lower extremity thereof being proximate to and spaced a small distance above the bottom of the decomposition vessel 47. The cylindrical tube 51 is suspended over the overflow tube 50 by means of a plate 52 secured to the upper end of the tube 51 and connected preferably eccentrically to a drive shaft 53, the latter being rotatably driven by any suitable drive means, such as a motor (not shown). Any tendency for the overflow tube 50 to siphon molten material from the vessel 47 is counteracted by providing one or more ports or passages 54 (FIG. 4) in the plate 52 which communicate with the surrounding gaseous atmosphere within the vessel 47 and provide a passage between the enclosed space within the agitator tube and the free space within the vessel 47. If, however, it is undesirable to have ports or slots in the upper closed end 52 of the agitator, the confined space above the liquid level within the tube 51 may be vented through a suitable passage in the drive shaft 53 to the atmosphere or other low pressure area, e.g. to the ammonia gas condensing system 57 hereinafter described. If desired, the tube 51 can be provided on the outer surface thereof with a spiral or other type of vane to agitate the contents of the chamber or vessel 47, particularly where the tube 51 is disposed concentrically about the overflow tube.

The decomposition vessel 47 is heated by means of the external heating coil 48, or by internal submerged heating units if desired, and is preferably maintained at a substantially uniform temperature which may range from about 500° F. to about 750° F. dependent upon the pressure conditions. At substantially atmospheric pressure good results are obtained at a temperature of from about 650° F. to about 675° F. It is quite important that the temperature be carefully controlled so as to obtain optimum decomposition of ammonium sulfate to ammonium bisulfate and ammonia without appreciable decomposition of the ammonium bisulfate to sulfur trioxide. In general, it has been found that a highly satisfactory uniform decomposition reaction can be obtained by maintaining a molten bath of ammonium bisulfate in the lower part of the decomposition vessel surrounding the lower end of agitator tube 51, and controlling the rate of withdrawal of molten ammonium bisulfate through the overflow outlet tube 50 as well as the rate of introduction of ammonium sulfate by the screw-type feeder 46, so as to maintain the level of the molten bath, designated at 49, substantially constant.

Referring again to FIG. 1, the ammonia gas produced in the decomposition vessel 47 is removed through a line 61 by means of a pump or blower 62 and is thereby drawn through a suitable purification chamber 63. Although only one such chamber 63 is shown, it will be understood that a plurality of absorption towers arranged in series may be employed for the purpose of removing moisture, ammonia liquor, tars, and traces of sulfur dioxide and sulfur trioxide which may be produced in the decomposition vessel 47. The impurities thus removed in the chamber 63 are withdrawn through a line 64 and disposed of along with other coke plant by-products. The purified ammonia gas stream passes from the pump 62 through a line 66 into a drying tower 67 and then into a compressor 68 where the ammonia is liquefied in the customary manner.

It will be apparent from the foregoing detailed description when taken in conjunction with the drawings and claims to follow, that the herein disclosed process and apparatus for fusing, dissolving, decomposing or otherwise converting a solid to a fluid, provides a very simple and efficient means for continuously contacting and agitating a solid with a liquid bath which insures good heat transfer therebetween, provides for a prolonged period for separation of the gases, and also avoids having the solids leave the treating or decomposition zone prematurely. Thus, in the novel process of the present invention, the solid is introduced initially into a primary fluidizing or decomposition zone containing a liquefying bath which in the preferred embodiment illustrated is defined by the inner wall surface of the vessel 47 and the outer surface of the flow-regulating tube 51, and the liquid products formed therein are conducted downwardly to a point below approximately the middle of the liquefying chamber or vessel 47 and preferably to a point adjacent the bottom of the said chamber, and thence the fluid products flow upwardly through a generally annular passageway 69 within the fluidizing or decomposition chamber which is defined in the preferred embodiment illustrated by the inner surface of the said flow-regulating member or tube 51 and the outer surface of the overflow outlet tube 50 from which the liquid product is continuously withdrawn. The downward and upward flow of the decomposition products provides a reverse flow or "two pass" system and makes possible improved heat transfer between the liquid and solid components and insures a significantly longer time for separation of the gases and liquid components before the liquid products leave the decomposition chamber. The baffle action of the agitator tube 51 prevents short-circuiting of solid ammonium sulfate directly to the outlet tube 50. Moreover, effective control of the temperature of the withdrawn ammonium bisulfate is maintained by virtue of the fact that the overflow tube 50 is immersed in the molten bath. And it should also be understood that the solid to be converted to a fluid can in one modified form of the invention be introduced into a centrally disposed primary zone of the fluidizing chamber where the liquid products first flow downwardly, pass outwardly below a relatively large diameter flow-regulating member having the upper end thereof extending above the liquid level and with the lower end thereof spaced from the bottom of the chamber, and thence the liquid flows upwardly to a circumferential annular overflow means or passage formed between the wall of the chamber and a large diameter cylindrical section spaced inwardly therefrom. In the latter form of the invention, the outer wall of the chamber defining the outer wall of the overflow means can be cooled or further heated, if desired.

While the instant process and apparatus has been specifically shown as part of a general process for the recovery of ammonia from coke oven gas, it should be understood that the invention can also be applied to other processes in which ammonium bisulfate is thermally decomposed, e.g. in a ferrous metal pickling process, such as described in U.S. Patent No. 2,700,004. Other applications of the process and apparatus can be made, such as the fusing or dissolving of any suitable salt or solid, whether or not actual chemical decomposition takes place, wherein heating or cooling in a reaction chamber is required while maintaining the salt or solid in contact with a liquid phase.

Others may practice the invention in any of the numerous ways which are suggested to one skilled in the art, by this disclosure, and all such practice of invention are considered to be a part hereof and falls within the scope of the appended claims.

I claim:

1. In apparatus for decomposing solid ammonium sulfate crystals into gaseous ammonia and liquid ammonium bisulfate, the improvement comprising; an ammonium sulfate decompositon chamber having lower and upper end wall sections and a lateral wall section, a heating means associated with said chamber, a wall of said chamber having an aperture in an upper portion of said chamber to provide a solid material inlet passage for introducing solid ammonium sulfate crystals into a primary decomposition zone within said chamber wherein molten ammonium bisulfate is maintained at a predetermined liquid level, a tubular baffle member with a substantially unobstructed lower end extending downwardly from above said liquid level to a point adjacent and spaced from said lower end wall section whereby said baffle member defines a secondary decomposition zone within said primary decomposition zone with said zones being in communication only at the lower ends thereof, and said baffle member mounted for rotatable movement about a vertical longitudinal axis substantially parallel with the longitudinal axis of said chamber to effect agitation within said chamber, an ammonium bisulfate outlet tube extending through said lower end wall section comprising the only liquid outlet passage of said chamber and extending upwardly from said lower end wall section into the interior of said chamber within said tubular baffle member to the height of said predetermined liquid level for maintaining liquid at said predetermined level, and a wall of said chamber being apertured at a point therein spaced from said first mentioned aperture above said predetermined liquid level to provide a gas outlet passage for conveying gaseous ammonia from said chamber; whereby said molten ammonium bisulfate formed within said decomposition zone is first conveyed downwardly and then upwardly within said chamber while being heated and agitated to separate solid ammonium sulfate and gaseous ammonia from said liquid ammonium bisulfate before said ammonium bisulfate is withdrawn from said chamber through said outlet tube.

2. In apparatus for continuously transforming a fusible solid material into a liquid substantially free of unfused solid material which includes means for contacting said solid material with a heated liquefying bath of fused solid material and continuously withdrawing fused material therefrom, the improvement comprising in combination; a chamber with upper and lower end wall sections and a lateral wall section, a heating means associated with said chamber for maintaining a fused bath of said solid material at a predetermined liquid level therein, a wall of said chamber having an aperture in an upper portion of said chamber at a point above said liquid level to provide a solid material inlet passage for introducing said solid material into said chamber, a tubular baffle member of smaller diameter than said chamber having an unobstructed lower end disposed within said chamber and defining between the exterior thereof and said lateral wall section a primary liquefying zone, said baffle mounted for rotatable movement about a vertical longitudinal axis parallel to the longitudinal axis of said chamber, and said baffle member extending downwardly from a point above said liquid level with the lower end of said baffle member terminating proximate to and spaced from said lower end wall section of said chamber, a liquid outlet tube extending through said lower end wall section comprising the only liquid outlet passage of said chamber and extending in an axial direction upwardly from said lower end wall section of said chamber into the interior of said chamber within said tubular baffle member to the height of said predetermined liquid level, said outlet tube adapted to maintain liquid in said chamber at said predetermined liquid level, and said baffle member together with said outlet tube defining therebetween a secondary liquefying zone within said chamber which is in communication with said primary liquefying zone only at the lower end portions thereof; whereby fused solid material within said chamber is thoroughly heated and agitated while passing downwardly through said primary liquefying zone and then upwardly through said secondary liquefying zone into said outlet tube which conveys fused solid material from said chamber substantially free of unfused solids.

3. An apparatus as defined in claim 1, wherein the longitudinal axis of said outlet tube coincides substantially with the longitudinal axis of the chamber and the axis about which said baffle member is rotatable is disposed eccentrically with respect to the longitudinal axis of said outlet tube.

4. An apparatus as defined in claim 1, wherein an upper end portion of the baffle member extending above the outlet tube has a transverse end plate disposed thereacross which is apertured to provide communication between the interior of said baffle member and the space within the said chamber above said liquid level.

5. An apparatus substantially as defined in claim 1, wherein the said baffle member has the upper end closed to prevent direct liquid flow between the interior of said baffle member and the space within said chamber above said liquid level and is provided with a direct tubular discharge passage extending from the space above the liquid level enclosed within the said baffle member outwardly through the wall of the decomposition chamber.

6. An apparatus as in claim 2, wherein the said baffle member is disposed eccentrically with respect to the longitudinal axis of said overflow outlet tube and the axis about which said baffle member is rotatable substantially coincides with the longitudinal axis of the said outlet tube; whereby the said baffle member functions to both agitate and regulate the flow of material in said chamber.

7. An apparatus as in claim 2, wherein the said baffle member has a transverse end plate extending across the upper section thereof at a point above the outlet tube with said end plate apertured to provide communication between the space enclosed within the baffle member and the surrounding atmosphere within the chamber.

References Cited in the file of this patent
UNITED STATES PATENTS

| | | |
|---|---|---|
| 2,599,466 | Lienhart | June 3, 1952 |
| 2,630,376 | Dunn | Mar. 3, 1953 |
| 2,899,277 | Holowaty | Aug. 11, 1959 |